No. 695,096. Patented Mar. 11, 1902.
J. P. FAIVRE.
BROILER.
(Application filed Aug. 19, 1901.)
(No Model.)
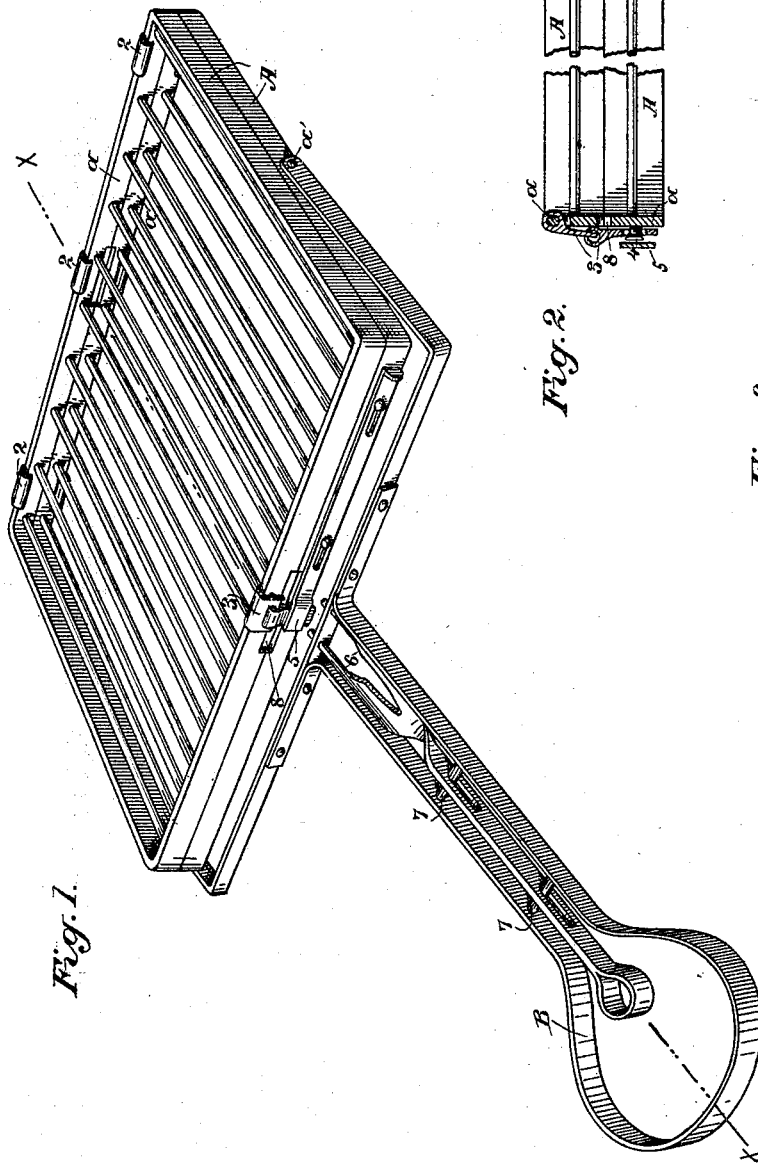
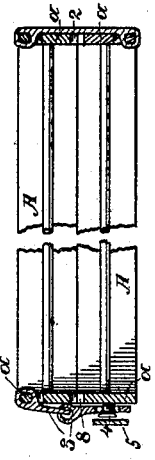
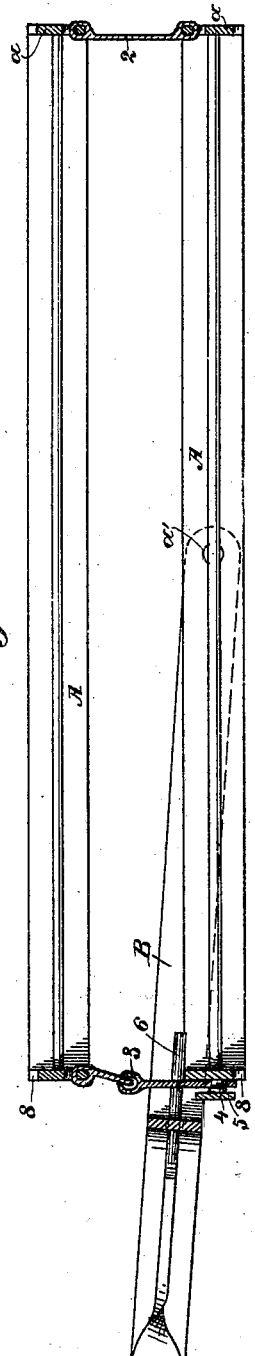

UNITED STATES PATENT OFFICE.

JACQUES P. FAIVRE, OF SAN FRANCISCO, CALIFORNIA.

BROILER.

SPECIFICATION forming part of Letters Patent No. 695,096, dated March 11, 1902.

Application filed August 19, 1901. Serial No. 72,506. (No model.)

*To all whom it may concern:*

Be it known that I, JACQUES P. FAIVRE, a citizen of the United States, residing in the city and county of San Francisco, State of California, have invented an Improvement in Broilers; and I hereby declare the following to be a full, clear, and exact description of the same.

My invention relates to improvements in broiling devices.

It consists of the parts and the constructions and combinations of parts hereinafter described and claimed.

Figure 1 is a general view of the broiler. Fig. 2 is a longitudinal central section through the same and showing the handled support omitted. Fig. 3 is a longitudinal section on the line $xx$ of Fig. 1, showing the grids in their widest separation.

A represents the grid members, each of which is composed of a marginal frame $a$, connected by cross-bars. These frames are preferably made of flat strips of metal, so that when the grids are folded upon one another in their shallowest position, as in Figs. 1 and 2, the edges of these strips will contact and form an inclosure to prevent any small or thin articles, as chops, bacon, oysters, &c., which may be cooking from dropping out when the broiler is turned over or reversed.

The grid members are connected at one end in the following manner: The hinges 2, consisting of metal straps, are secured to the frame $a$ in such manner that either grid may be turned in a complete circle about the other, so as to bring either of the sides of one grid adjacent to one or the other of the sides of the other grid, and also that a wider or narrower space may be left between the grids. In the present instance these hinges are in length approximately equal to the width of the two abutting frames $a$ and are attached at the outer edges of the latter. Thus when one grid is turned on these hinges about the other from the position shown in Figs. 1 and 2 the grid-frames will then be separated a distance equal approximately to the length of the hinges, and thus allow articles of considerable thickness, as fowl, &c., to be held between the grids. Thus one broiler is capable of doing that which two broilers are ordinarily required to accomplish. At the other or "forward" end, as it may be termed, of the grids a corresponding adjustable latch is provided, by which the grids may be locked together in either of the positions above described. This latch consists of a flexible hasp 3, pivoted to the upper edge of the upper grid, as in Figs. 2 and 3, and having a perforation into which a pin 4, secured upon the frame of the other grid and near the lower edge thereof, is adapted to pass. The sliding bar 5 upon the frame of the lower grid prevents the hasp from disengaging said pin. The hasp is made flexible in order to accommodate it to the flexibility of the grid-hinges when the grids are in their separated position; otherwise were this hasp in one piece it would likely be broken or bent or become disengaged from the lock-bar 5. The grids are pivoted centrally of their sides, as at $a'$, to the arms of the handle B, so as to be turnable end for end. A latch 6, slidable in the handle and supported in the guides 7, is adapted to lock the grids in a horizontal position. This locking is effected by the end of the latch passing between the frames of the grids. The frames $a$ are notched, as at 8, upon their adjacent contacting edges in order to permit of the insertion of the latch to hold the grids when they are locked in their shallowest position, as in Figs. 1 and 2.

Having thus described my invention, what I claim as new, and desire to secure by Letters Patent, is—

1. A broiler including grid members hinged at one side and having their hinges capable of permitting the grid members to be separated a greater or less distance as the said members are folded upon themselves; a handled support in which said members are turnable; and a latch within the handle of the support and extending lengthwise of the same and slidable endwise, and having its inner end to directly engage with and lock the grid members to the support.

2. A broiler consisting of grid members, hinged connections at one side thereof; a hasp hinged to the opposite side of one of said members and a stud on the other member with which the hasp engages to unite the members; a bar slidable transversely across one of the grid members and over the hasp, to secure the latter; a support in which the grids are turnable, said support having a handle; and a latch carried by the handle and having its inner end to directly engage the grids to secure them against turning about their pivotal centers.

3. A broiler consisting in combination of grid members having their hinges adapted to permit the grids to be separated a greater or less distance as the grids are folded upon themselves, an adjustable lock mechanism therefor, a handle having arms in which said grids are pivoted and turnable, and a sliding latch in said handle extending in the direction of the length thereof whereby the grids may be directly engaged and prevented from turning on said pivots.

In witness whereof I have hereunto set my hand.

JACQUES P. FAIVRE.

Witnesses:
S. H. NOURSE,
JESSIE C. BRODIE.